United States Patent

Shiga et al.

[11] Patent Number: 5,471,890
[45] Date of Patent: Dec. 5, 1995

[54] STARTER

[75] Inventors: Tsutomu Shiga, Nukata; Nobuyuki Hayashi, Nagoya; Masanori Ohmi, Anjo; Yasuhiro Nagao, Okazaki; Mitsuhiro Murata, Anjo, all of Japan

[73] Assignee: Nippondenso Co., Ltd., Kariya, Japan

[21] Appl. No.: 392,195

[22] Filed: Feb. 22, 1995

[30] Foreign Application Priority Data

Sep. 19, 1994 [JP] Japan .................... 6-222328

[51] Int. Cl.⁶ .................................... F02N 15/06
[52] U.S. Cl. ................ 74/7 E; 188/82.84; 192/45; 475/318
[58] Field of Search ................... 74/7 E; 475/263, 475/267, 318; 192/45; 188/82.84

[56] References Cited

U.S. PATENT DOCUMENTS

| | | | |
|---|---|---|---|
| 1,443,248 | 1/1923 | Defordt | 192/45 |
| 4,615,227 | 10/1986 | Stockton | 74/7 E |
| 4,680,979 | 7/1987 | Morishita | 74/7 E |
| 4,852,708 | 8/1989 | Parkhurst | 192/45 |
| 5,088,338 | 2/1992 | Konishi | 74/7 E |
| 5,154,090 | 10/1992 | Konishi | 74/7 E |
| 5,156,057 | 10/1992 | Isozumi | 74/7 E |
| 5,195,389 | 3/1993 | Isozumi | 74/7 E |
| 5,199,309 | 4/1993 | Isozumi | 74/7 E |
| 5,318,160 | 6/1994 | Oomi et al. | 192/45 |

FOREIGN PATENT DOCUMENTS

| | | |
|---|---|---|
| 5219528 | 7/1950 | Japan . |
| 140380 | 12/1920 | United Kingdom . |

Primary Examiner—Charles A. Marmor
Assistant Examiner—Troy Grabow
Attorney, Agent, or Firm—Cushman, Darby & Cushman

[57] ABSTRACT

A starter with an improved overrunning clutch for automotive use. The overrunning clutch has a clutch outer integrally formed with an internal gear of a planetary gear speed reduction mechanism driven by a starter motor, a clutch inner integrally formed with a center bracket which supports a drive shaft rotatably therethrough and rollers interposed between cylindrical portions of the clutch outer and the clutch inner. On the inner circumference of the clutch outer, roller storage portion is formed to extend radially circumferentially so that the roller is fully stored therein at the time of overrunning.

8 Claims, 8 Drawing Sheets

STARTER

CROSS REFERENCE TO RELATED APPLICATION

This application is based upon and claims priority of Japanese Patent Application No. 6-222328, filed Sep. 19, 1994, the content of which is incorporated herein by reference.

BACKGROUND OF THE INVENTION

1. Field of the Invention

The present invention generally relates to a starter with epicycle or planetary gear speed reduction mechanism having an overrunning clutch and, more particularly, it relates to a starter which has an improved overrunning clutch for automotive use.

2. Related Art

In the conventional starter with epicycle gear or planetary gear speed reduction mechanism disclosed in Japanese Utility Model Laid-open Publication No. 52-19528, an overrunning clutch is set or mounted between the outer circumference surface of an internal gear of the epicycle gear reduction mechanism and the inner circumference surface of a casing that acts as the fixing side to store the epicycle gear speed reduction mechanism.

In the conventional structure explained above, with the overrunning clutch being set on the outer circumference of the epicycle gear speed reduction mechanism, any axial direction space for the over running clutch is not required, the dead space is small, and increased manufacturing costs caused by an increase in weight are low. Furthermore, even if a drive transmission portion with a large diameter is required for the high-load overrunning clutch, the outer circumference of the epicycle gear speed reduction mechanism can be used.

However, as the overrunning clutch portion is set on the outer circumference of the epicycle gear speed reduction mechanism, the diameter of the clutch inner member naturally increases, causing the following types of problems. For example, when comparing the starter with the case when the thickness of the clutch inner is the same as the thickness of the clutch inner of the roller-type overrunning clutch set on the starter output shaft, the clutch according to the above publication has the ratio the thickness to the outer diameter of the clutch inner decreases, and the mechanical strength of the clutch inner as a ring drops. The amount that the clutch inner deforms due to the inner radial force applied on the roller contact portion of the clutch inner increases, and thus, the resistance force of the contact surface required for conveying the torque may not be achieved, or a high torque conveyance may not be possible. If the thickness of the clutch inner is secured to resolve this problem, the inner diameter of the internal gear will be determined by the dimensions of the epicycle gears, etc., housed or by the number of teeth due to the speed reduction ratio, so the outer diameter must be increased, and thereby the epicycle gear speed reduction mechanism has a diameter larger than the other parts.

Furthermore, as the clutch outer member (roller cam) is mounted on the front bracket, when the starter is overrun by the engine, the ring gear (clutch inner) rotates to absorb the rotational difference between the pinion gear rotated by the engine and the starter motor so that the overrun rotation is not conveyed to the starter motor. The roller wears is caused because the rollers constantly contact the outer circumference of the clutch inner.

As this overrunning clutch has a structure wherein the rotational force is conveyed when the roller bites, in the small narrow direction, into the wedge-shaped space formed between the cam-shaped groove set on the inner circumference of the bracket with is the fixing side of the clutch outer and inclined circumferentially and the outer circumference of the internal gear of the epicycle gear speed reduction mechanism that is the clutch inner. Therefore, when the starter overruns, the internal gear that acts as the clutch inner are rotated at a high speed, and since these are made of metal and heavy, the inertia energy during rotation is large. If the engine is rapidly changed from the overrun state to the drive state, the impact applied on the other clutch parts increases, an unbalance occurs during rotation, the device may be damaged or an abnormal noise may be heard during drive.

SUMMARY OF THE INVENTION

The present invention therefore has a primary object to provide a starter with highly reliable overrunning clutch in which the torque is accurately conveyed.

The present invention has a further object to provide a starter with a compact and light-weight overrunning clutch for automotive use.

In a starter according to the present invention, a first cylinder portion set on an internal gear of an epicycle or planetary gear speed reduction device is used as a clutch outer and a second cylinder portion that functions as a fixing side is used as a clutch inner. A roller storage portion is formed in the inner circumference of the clutch outer. Thus, when the starter is overrun by an engine, the clutch outer runs idly to the clutch inner so as to absorb the rotational difference of a starter motor and a pinion gear. The roller receives a centrifugal force and separate from the outer circumference of the clutch inner thus preventing abnormal wear of the roller or outer circumference of the clutch inner.

Preferably, grooves to store part of the roller is set also on the second cylinder portion. The roller is passed through that portion and are sandwiched in the front and rear torque conveyance direction by the roller storage portion and roller contact side of the groove portion, so a large stress such as that applied when using the roller-type overrunning clutch incorporating a wedge-effect is not applied on each contact surface and contact surface with the roller. This allows an overrunning clutch with a large capacity to be provided.

More preferably, the number of grooves is larger than the number of storage portion. So if the roller reengages with the roller groove when the starter is started, such as when the roller is not engaged with the roller groove or when the engine is suddenly stopped from the starter overrun state and suddenly driven again, the idle run distance between the first and second cylinder portions is shortened, and the impact generated during engagement can be suppressed.

More preferably, the roller engagement surface has a curvature ratio that is approximately the same as the roller radius, so the torque conveyance surface widens, and a clutch with a large torque capacity can be provided.

DETAILED DESCRIPTION OF THE PRESENTLY PREFERRED EMBODIMENTS

The present invention is described in more detail with reference to the embodiments illustrated in the accompanying drawings.

First Embodiment

The first embodiment of the starter according to the present invention will be described with reference to FIG. 1 through FIG. 11.

Figure 1:
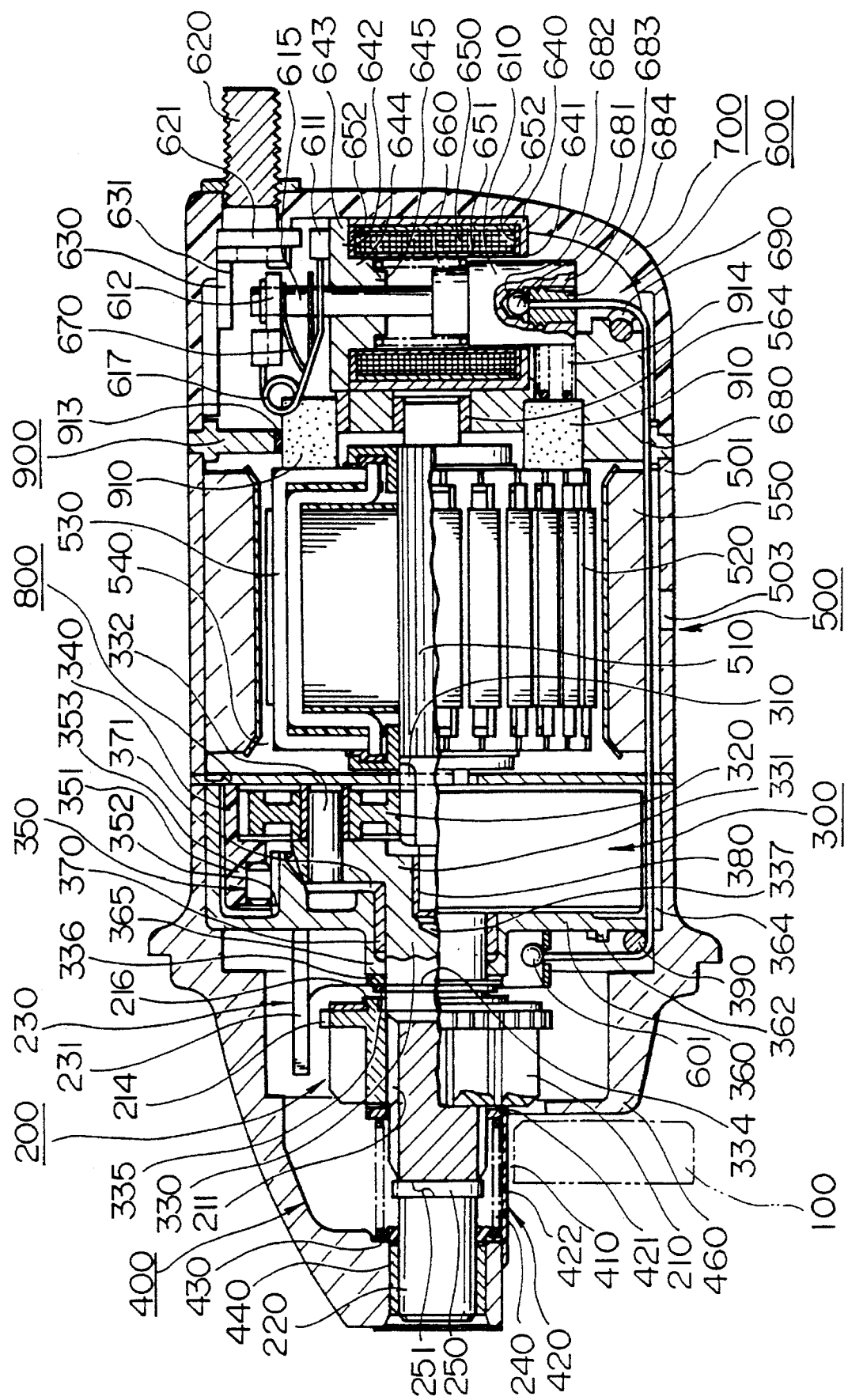
FIG. 1 is a side cross-sectional view illustrating the first embodiment of a starter according to the present invention.

The starter is largely comprised of, as shown in FIG. 1, a pinion 200 that engages with a ring gear 100 of an engine (not shown), a housing 400 that covers an epicycle gear or planetary gear speed reduction mechanism 300, a motor 500, and an end frame 700 that covers a magnet switch 600. Inside the starter, the housing 400 and motor 500 are separated by a motor wall 800, and the motor 500 and end frame 700 are separated by a brush holding member 900.

[Pinion 200]

Figure 2A:
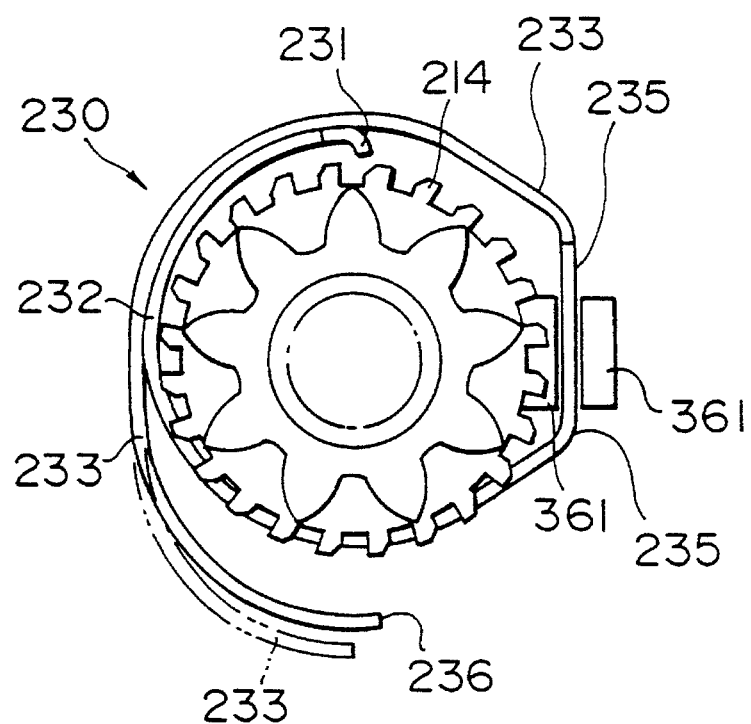
FIG. 2A and 2B are a front view and partial cross-sectional view illustrating a pinion rotation restriction member assembled onto a pinion portion.
Figure 2B:
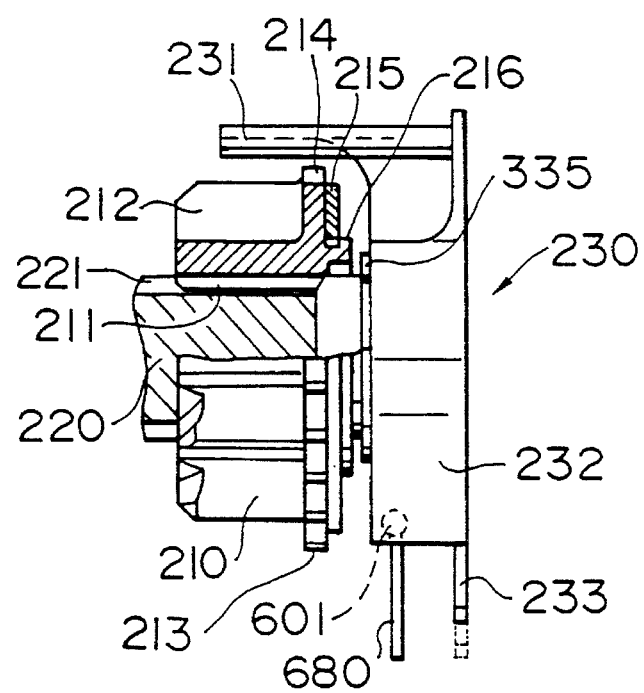

As shown in FIG. 1 FIG. 2A and FIG. 2B, a pinion gear 210 that engages with the engine ring gear 100 is formed on pinion 200. A pinion helical spline 211 that fits with a helical spline 221 formed on an output shaft 220 is formed on the inner circumference of the pinion gear 210.

A flange 213 of which outer diameter is larger than the pinion gear 210 is formed in a ring-shape on the ring gear side opposite of the pinion gear 210. Notches 214 of which the number is larger than that of outer teeth of pinion gear 210 are formed on the outer circumference of the flange 213. These notches 214 fit with a restriction claw 231 on a later-described pinion rotation restriction member 230. A washer 215 can freely rotate and does not fall out in the axial direction at the rear of the flange 213 as a round ring portion 216 formed on the rear end of the pinion gear 210 is bent toward the outer circumference.

The pinion gear 210 is constantly biased toward the rear of an output shaft 220 by a return spring 240 composed of compressed coil spring. The return spring 240 does not directly bias the pinion gear 210, but in this embodiment biases the pinion gear 210 via a ring body 421 on a shutter 420 described later that opens and closes an opening portion 410 of the housing 400.

[Pinion Rotation Restriction Member 230]

The restriction claw 231 that forms the restriction portion extended in the axial direction to fit with the multiple notches 214 formed on the flange 213 of the pinion gear 210 is formed on one end of a rotation restriction portion 232. The restriction claw 231 fits with the notches 214 on the pinion gear 210. Furthermore, to improve the rigidity of the restriction claw 231, it is formed to extend in the axial direction, and has a cross-sectional L-shape that is bent toward the inner radial direction. The claw 231 is bar-shaped.

A string-shaped member 680 with balls 601 and 682 is a conveyance means to convey operation of the magnet switch 600 to the restriction claw 231 through pulley 690. A rotation restriction portion 232 coupled with the member 680 is pulled downward according to the magnet switch operation so that the restriction claw 231 fits with one of the notches 214 on the flange 213 of the pinion gear 210. At this time, one end 236 of a return spring portion 233 is contacted with a restriction shelf 362 to restrict the position, and the return spring portion 233 slacks. The restriction claw 231 is fit with one of the notches 214 of the pinion gear 210, so when rotation of the pinion gear 210 is attempted by an armature shaft 510 of the motor 500 and the speed reduction mechanism 300, the pinion gear 210 advances along the helical spline 221 of the output shaft 220. When the pinion gear 210 contacts the ring gear 100, and the advance of the pinion gear 210 is prevented, the pinion rotation restriction member 230 slacks due to the further rotational force of the output shaft 210. The pinion gear 210 will rotate slightly and engage with the ring gear 100. When the pinion gear 210 advances, the restriction claw 231 is disengaged from the notches 214, and the restriction claw 231 drops behind the rear of the flange 213 of the pinion gear 210. The front end of the restriction claw 231 contacts the rear surface of the washer 215 and retraction of the pinion gear 210 is prevented by the rotation of the ring gear 100.

[Pinion Fitting Ring 250]

A pinion fitting ring 250 is fixed on a cross-sectional rectangular ring groove formed on the periphery of the output shaft 220. This pinion fitting ring 250 is formed by round-machining cross-sectional rectangular steel material. Approximate by S-shaped notches 251 (example of fitting means) are formed on both ends. One convex notch fits with the other concave notch, and one convex notch fits with the other concave notch.

[Epicycle Gear Speed Reduction Mechanism 300]

The epicycle gear or planetary gear speed reduction mechanism 300 shown in FIG. 1 is a deceleration means that decelerates the rotation of the motor 500 explained later and increases the motor 500 output torque. The epicycle gear speed reduction mechanism 300 is composed of the sun gear 310 formed on the front outer circumference of an armature shaft 510 (explained later), multiple planetary gears 320 that are engaged with the sun gear 310 and that rotate around the sun gear 310, a planet carrier 330 that rotatably supports the planetary gears 320 around the sun gear 310 and that is integrated with the output shaft 220, and a tubular resin internal gear 340 that is engaged with the planetary gear 320 on the circumference of the planetary gear 320.

[Overrunning Clutch 350]

Figure 3:
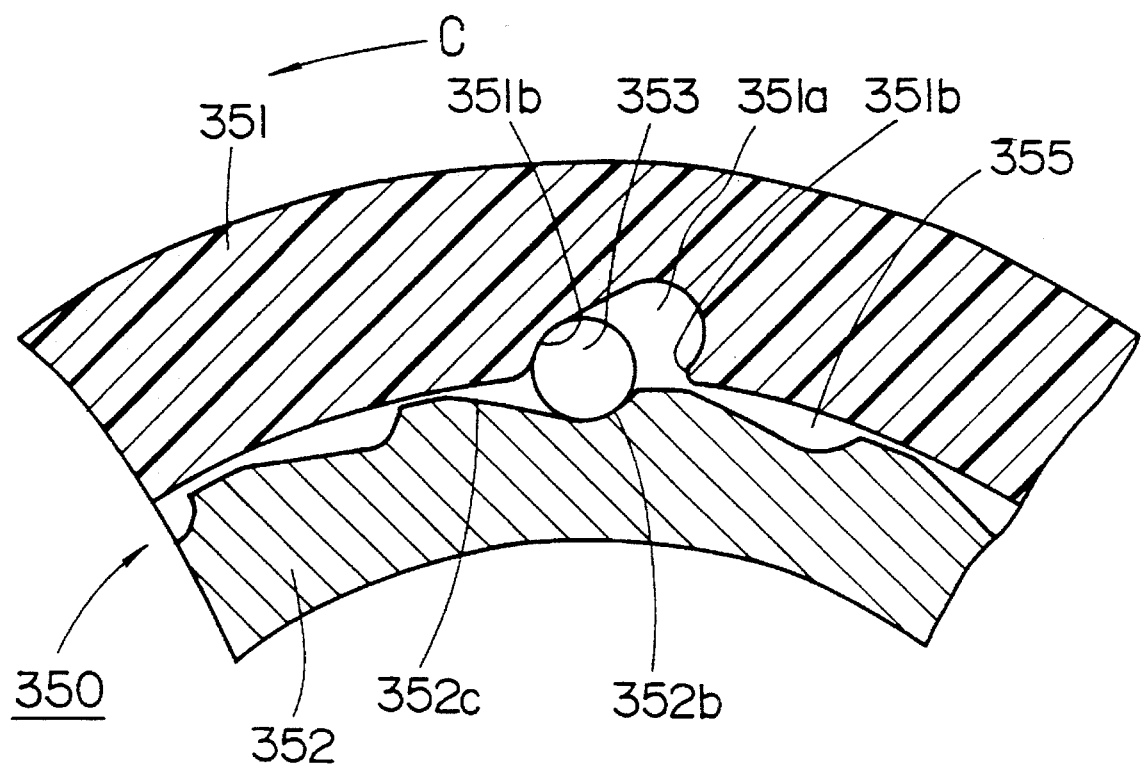
FIG. 3 is a cross-sectional view illustrating a part of an overruning clutch.

As shown in FIG. 1, an overrunning clutch 350 rotatably supports the internal gear 340 in one direction only in direction rotatable with engine rotation. FIG. 3 is a partial enlarged view of the overrunning clutch 350. The overrunning clutch 350 is composed of a clutch outer 351 that acts as a first cylindrical portion integrated with the front side of the internal gear 340, a ring-shaped clutch inner 352 that acts as a second cylindrical portion arranged coaxially to oppose the inner circumference of the clutch outer 351 and that is formed on the rear surface of a center bracket 360 that acts as the fixing side that covers the front side of the epicycle gear speed reduction mechanism 300, and rollers 353 (only one is shown in FIG. 3) stored in the roller storage portion 351a formed outwardly and radially at an inclination from the inner circumference surface of the clutch outer 351. This roller storage portion 351a has a roller engagement side 351b that is inclined circumferentially and that engages with the roller 353 when the starter is driven.

Multiple roller groove portions 355 are formed circumferentially on the outer circumference of clutch inner 352. These roller groove portions 355 have the roller fitting surface 352b that fits with the roller 353 when the starter with speed reduction mechanism starts, and the roller guide surface 352c that leads to this roller storage portion 352b. On the opposite surface of the roller fitting surface 351b of the roller storage portion 351a, is a roller storage guide portion 351d that functions to lift the roller 353 up to the roller storage portion 351a when the starter with speed reduction mechanism overruns. In this embodiment, there are more roller groove portions 355 formed than the roller storage portion 351a of the clutch outer 351. However, if at least the same number are formed as rollers 353, a clutch equivalent to the torque conveyance capacity can be structured.

The positional relation of the roller fitting surface 351b and roller fitting surface 352b is configured so that the roller 353 is sandwiched from before and after the torque conveyance direction by each surface when the starter with speed reduction mechanism is driven. Each roller storage portion 351a of the clutch outer 351 is set so that the maximum inner diameter of the roller 353 is slightly larger than the maximum outer diameter of the clutch inner 352 when the roller 353 is stored deep into the storage portion 351a during overrunning of the starter with speed reduction mechanism, so that the clutch outer 351 rotates around the clutch inner 352.

With this type of structure, the first cylindrical portion set on the internal gear 340 of the epicycle gear mechanism 300 acts as the clutch outer 351, and the second cylindrical portion which acts as the fixing side is used as the clutch inner 352 to form the roller storage portion 351a for the roller 353 on the inner circumference of the clutch outer 351. When the starter is overrun by the engine, the roller 353 receives the centrifugal force and separates from the outer circumference of the clutch inner 352. Thus, if the starter is overrun by the engine, the internal gear 340 that is the clutch outer 351 runs idly to the clutch inner 352 to absorb the rotational difference between the motor 500 and pinion gear 210. This prevents abnormal wear of the roller 353 or outer circumference of the clutch inner 352.

Furthermore, a large stress like the roller-type overrunning clutch using a wedge-effect for the contact portion of the roller engagement surface 352b and roller 353 is not applied on the clutch inner 352 that is the second cylindrical portion. Therefore, an overrunning clutch with a large torque capacity can be provided. As the overrunning clutch 350 uses a center bracket 360 to rotatably support the output shaft 220 via a bearing 370, the axial length does not need to be lengthened, and the size can be reduced.

[Center Bracket 360]

Figure 4:
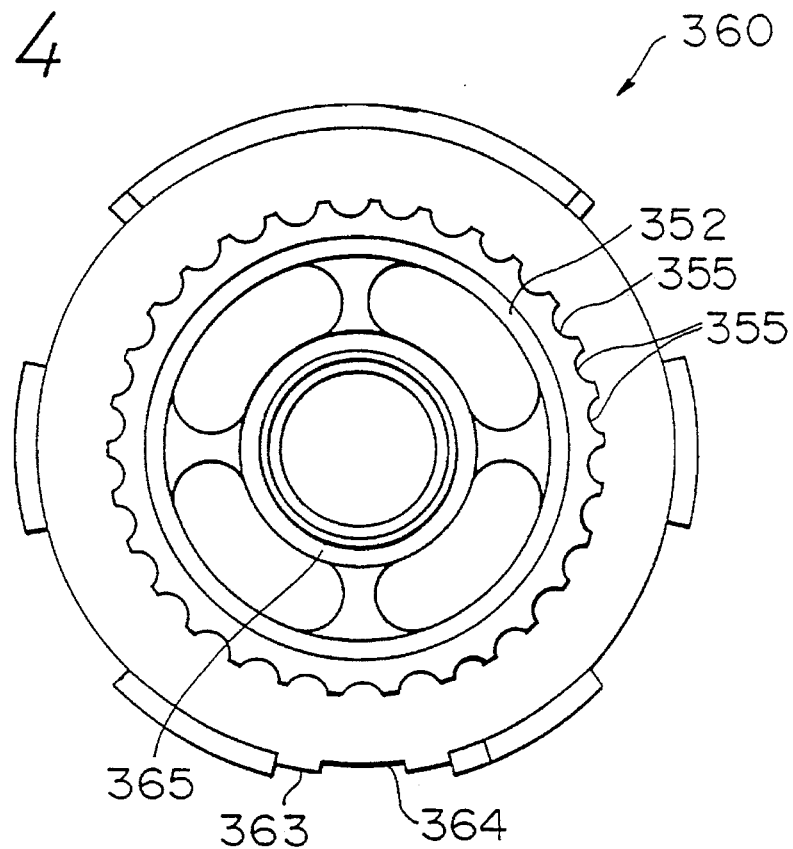
FIG. 4 is a rear view illustrating a center bracket.
Figure 5:
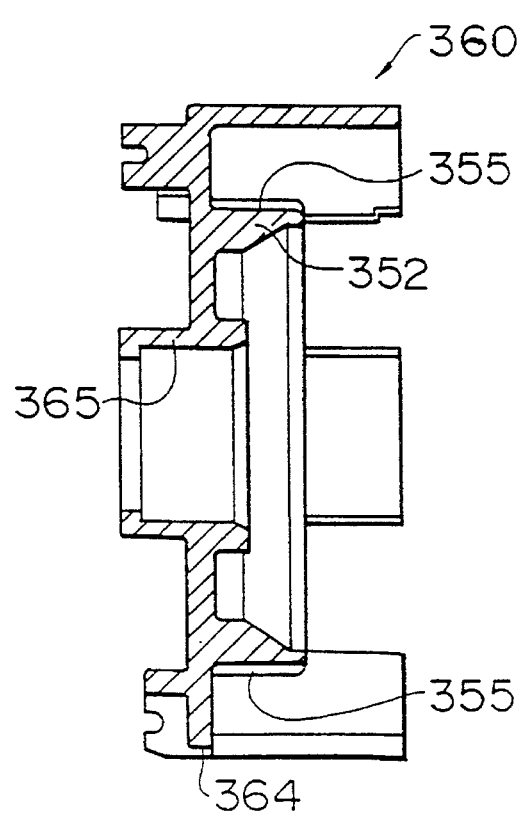
FIG. 5 is a cross-sectional view illustrating the side of the center bracket.

The center bracket 360 shown in FIGS. 4 and 5 is arranged inside the rear side of the housing 400. The housing 400 and center bracket 360 are coupled with a ring spring 390 of which one end is fit to the housing 400 and the other end is fit to the center bracket 360. The rotational reaction received by the clutch inner 352 that forms the overrunning clutch 350 is absorbed by the ring spring 390 so that the reaction is not directly conveyed to the housing 400.

Two support arms 361 (FIG. 2A) that hold the pinion rotation restriction member 230 and a restriction shelf 362 mounted on the lower end of the pinion rotation restriction member 230 are set on the front of the center bracket 360. Furthermore, multiple notched portions 363 that engage with the convex notched portions (not illustrated) on the inner side of the housing 400 are formed on the center bracket 360 to be used as air passages to lead air in the housing 400 into a yoke 501. Concave portions 364 are formed on the lower end of the center bracket 360 to pass the string-shaped member 680 (explained later) in the axial direction.

[Planet Carrier 330]

A planet carrier 330 has a flange-shaped projection portion 331 that extends in the radial direction to support the planetary gears 320. Pins 332 that extend toward the rear are fixed onto this flange-shaped projection portion 331, and these pins 332 rotatably support the planetary gear 320 via a metal bearing.

The planet carrier 330 is rotatably supported by a housing bearing 440 of which front end is fixed on the inner front of the housing 440 and a center bracket bearing 380 fixed inside the tubular portion 365 on the inner circumference of the center bracket 360. This planet carrier 330 has a ring groove 334 on the front end position of the inner tubular portion 365, and a snap ring 335 is fit into this ring groove 334. A rotatable washer 336 mounted on the planet carrier 330 is inserted between the snap ring 335 and front end of the inner tubular portion 365. The backward movement of the planet carrier 330 is restricted by the direct contact of the snap ring 335 to the forward end of the inner tubular portion 365 via the washer 336. The rear end of the center bracket bearing 370 that supports the rear side of the planet carrier 330 has a flange portion 371 sandwiched between the rear end of the inner tubular portion 365 and the flange-shaped projection portion 331. The forward movement of the planet carrier 330 is restricted by the direct contact of the flange-shaped projection portion 331 to the rear end of the inner tubular portion 365 via the flange portion 371. A concave notch 337 that extends radially is created on the rear side of the planet carrier 330. The forward end of the rotatable armature shaft is supported via the planet carrier bearing 380 arranged in this concave notch 337.

[Housing 400]

The housing 400 supports the output shaft 220 with the housing bearing 440 fixed on the inner front end of the housing 400, and has a water barrier wall 460 that acts as a projection portion to keep the clearance between the housing 400 and the outer diameter of the pinion gear 210 at the lower portion of the opening 410 to the minimum to reduce the entering of rain water, etc., from the opening 410. On the lower front end of the housing 400, a shutter 420 explained later is set axially movably.

[Shutter 420]

The shutter 420 is made of a resin material such as nylon, and is mounted on the periphery of the output shaft 220. The shutter 420 is configured of a ring body 421 sandwiched between the return spring 240 and the pinion gear 210, and a water barrier portion 422 that opens and closes the opening portion 410 of housing 400.

When the pinion gear 210 starts to advance along the output shaft 220 when the starter starts, the ring body 421 also advances with the pinion gear 210. The water barrier portion 422 integrated with the ring body 421 also advances, opening the opening portion 420 of the housing 400. When the starter stops and the pinion gear. 210 retracts along the output shaft 210, the ring body 421 also retracts with the pinon gears 210. The water barrier portion 422 integrated with the ring body 421 also retracts, closing the opening portion of the housing 400. As a result, the shutter 420 that acts as an opening/closing means prevents the entering of rain water that splatters due to the centrifugal force of the ring gear 100 into the housing when the starter is not operating.

[Seal Member 430]

A ring-shaped groove is formed on the end of a seal member 430, and one end of the return spring 240 is set inside this ring-shaped groove. This seal member 430 seals the periphery of the output shaft 220 so the rain water or dust that enters from the opening portion 410 of the housing 400 is prevented from entering the housing bearing 440 on the front end of the housing 400.

[Motor 500]

The motor 500 is enclosed by the yoke 501 having an air discharge hole 503, motor wall 800 and the brush holding member 900 explained later. The motor wall 800 sandwiches the epicycle gear mechanism 300 between the center bracket 360, and prevents the lubrication oil in the epicycle gear mechanism from entering the motor 500.

As shown in FIG. 1, the motor 500 is composed of the armature shaft 510, the armature 540 fixed to this armature shaft 510 and composed of the armature core 520 and armature coil 530 that integrally rotate, and the fixed magnetic pole 550 that rotates the armature 540. The fixed magnetic pole is fixed to the inner circumference of the yoke 501.

[Armature Shaft 510]

The armature shaft 510 is rotatably supported by the planet carrier bearing 380 on the inner rear of the planet carrier 330 and a brush holding member bearing 564 fixed on the inner circumference of the brush holding member 900. The front end of this armature shaft 510 is inserted through the inner side of the epicycle gear speed reduction mechanism 300, and as mentioned above the sun gear 310 of the epicycle gear speed reduction mechanism 300 is formed on the outer circumference of the forward end of the armature shaft 510.

[Armature Coil 530]

Figure 6:
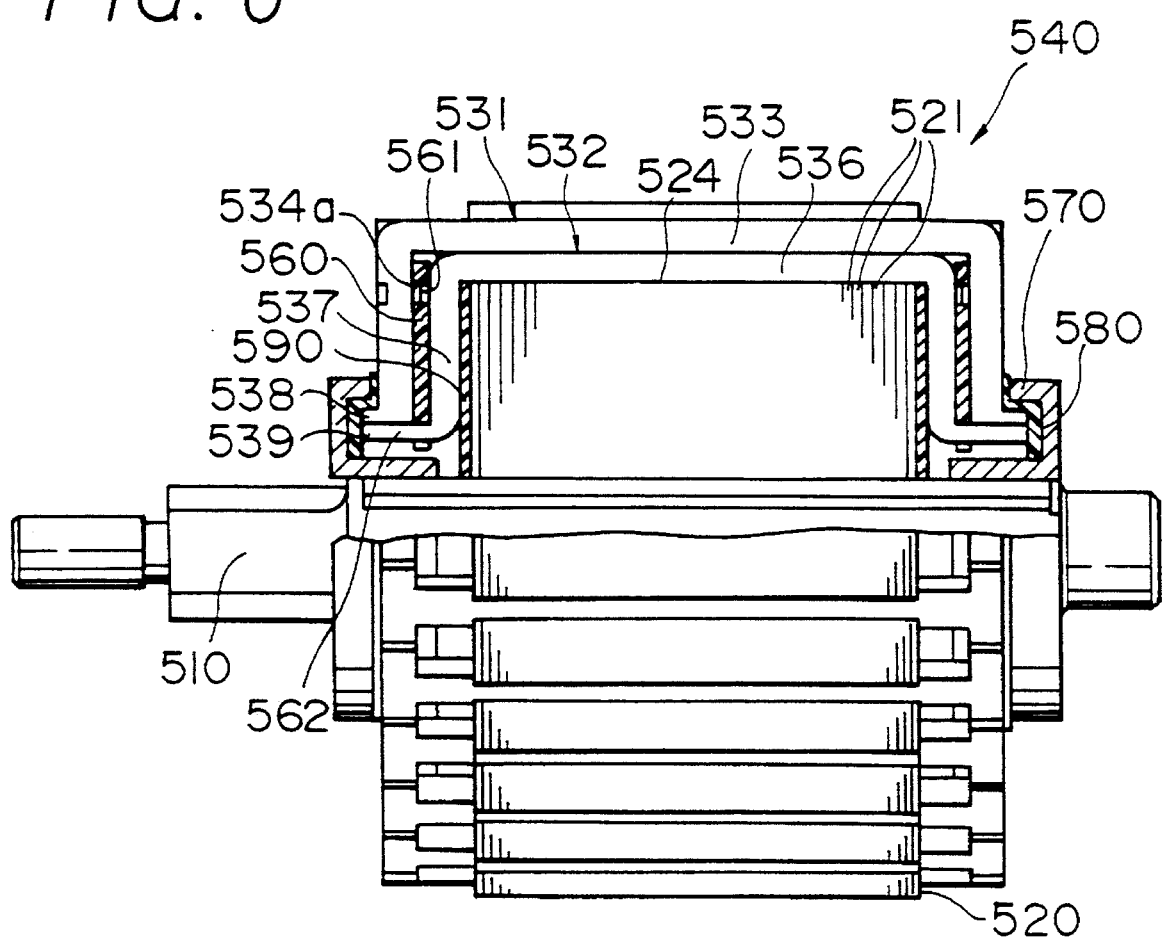
FIG. 6 is a half side cross-sectional view illustrating an armature.

In this embodiment, as shown in FIG. 6, multiple (for example 25) upper coil bars 531 and the same number of lower coil bars 532 are used for the armature coil 530. Each of the upper coil bars 531 and lower coil bars 532 are radially piled to form two-layer winding coils. Each upper coil bar 531 and each lower coil bar 532 are combined, and the ends of each upper coil bar 531 and each lower coil bar 532 are electrically connected to form a ring-shaped coil.

[Upper Coil Bar 531]

The upper coil bar 531 is composed of a material such as copper having an outstanding conductivity and has an upper coil piece 533 that is held in the outer circumference of a slot 524 formed axially through a stack of core plates 521. It extends in parallel to the fixed magnetic pole 550, and has two upper coil ends 534 that are bent inward from both ends of the upper coil piece 533 and that extend perpendicularly in the axial direction of the armature shaft 510. The upper coil piece 533 and the two upper coil ends 534 can be integrally shaped with cold forging, bent and formed in a ⊐-shape with a press, or can be separately formed upper coil piece 533 and two upper coil ends 534 that are connected with welding.

[Lower Coil Bar 532]

As with the upper coil bar 531, the lower coil bar 532 has a lower coil piece 536 and is composed of a material such as copper having an outstanding conductivity that is held in the outer circumference of the slot 524. It extends in parallel to the fixed magnetic pole 550, and has two lower coil ends 537 that are bent inward from both ends of the lower coil piece 536 and that extend perpendicularly in the axial direction of the shaft 510. The lower coil piece 536 and two lower coil ends 537 can be integrally cold casting, bent and formed in a U-shape with a press, or can be separately formed lower coil piece 536 and two lower coil ends 537 that are connected with welding, etc., as with the upper coil bar 531.

The insulation of each upper coil end 534 and each lower coil end 537 is ensured with an insulation spacer 560. The insulation between each lower coil end 537 and the armature core. 520 is ensured with a resin (e.g., nylon or phenol resin) insulation ring 590.

An upper inner extension portion 538 that extends axially is formed on the inner circumference ends of the two upper coil ends 534. The lower inner extension portion 539 on the inner end of the lower coil bar 532 explained above is layered with the inner circumference of this upper inner extension portion 538. These are electrically and mechanically connected with connection technology such as welding. The outer circumference of the upper inner extension portion 538 contacts the inner surface of the outer circumference ring portion of the fixing member 570 press-fixed onto the armature shaft 510 via with an insulation cap 580.

In this armature 540, the upper coil ends 534 on both ends of the upper coil bar 531 and the lower coil ends 537 on both ends of the lower coil bar 532 that form the armature coil 530 together are each set to be perpendicular to the axial direction of the armature shaft 510. Therefore, the axial length of the armature 540 can be reduced, the axial length of the motor 500 can also be reduced, and the starter can be smaller than the conventional structure.

[Fixed Magnetic Pole 550]

The fixed magnetic poles 550 are fixed to the inside of yoke 501 with the fixing sleeve 553 set on the inner circumference of the fixed magnetic pole 440. In this embodiment, permanent magnets are used, however, field coils that generate a magnetic force electrically can be used instead of the permanent magnets.

[Magnet Switch 600]

As shown in FIG. 1, the magnet switch 600 is held by the brush holding member 900 explained later and is arranged in the end frame 700 explained later. The magnet switch 600 is fixed to be approximately perpendicular to the armature shaft 510. With electrical conductivity to an attraction coil 650, the magnet switch 600 drives a plunger 610 coupled to the member 680 upward, and contacts two contacts (lower movable contact 611 and upper movable contact 612) that move integrally with the plunger 610 to sequentially contact with a head 621 of a terminal bolt 620 and a contact portion 631 of a fixed contact 630. A battery cable not illustrated is connected to the terminal bolt 620 to supply battery voltage to the head 621 and the contact 630.

A plunger shaft 615 that extends upward over the plunger 610 is fixed on the upper side of the plunge 610. This plunger shaft 615 protrudes upward from the through hole on the center of a stationary core 642. The upper movable contact 612 that slides freely through the vertical direction along the plunger shaft 615 is located on the upper side of the plunger shaft stationary core 642.

Figure 7:
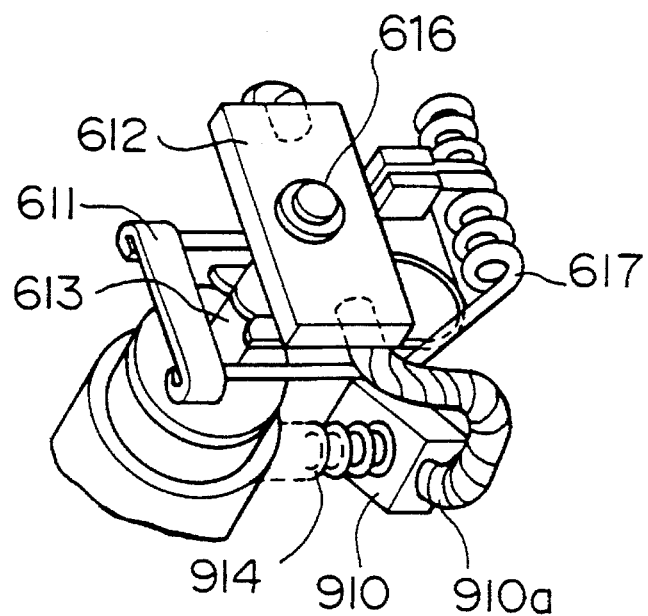
FIG. 7 is a perspective view illustrating a magnet switch plunger.

This upper movable contact 612 is restricted from moving over the upper end of the plunger shaft 615 by a fixing ring 616 installed on the upper end of the plunger shaft 615 as shown in FIG. 7. As a result, the upper movable contact 612 slides freely in the vertical direction along plunger shaft 615 between the fixing ring 616 and stationary core 642. The upper movable contact 612 is constantly biased upward by a contact pressure spring 670 formed by a plate spring installed on the plunger shaft 615.

The upper movable contact 612 is composed of a metal such as copper having an outstanding conductivity. When both ends of the upper movable contact 612 move upward, the two contact portions 631 on the fixed contact 630 are contacted. Each lead wire 910a for the pair of brushes 910 is electrically and mechanically connected with caulking or welding to the upper movable contact 612. The ends of resistor 617 that acts as multiple restriction means (two in this embodiment) are inserted and electrically and mechanically fixed to the grooves on the upper movable contact 612.

Each lead wire 910a for the pair of brushes 910 is electrically and mechanically connected with caulking or welding to the upper movable contact 612, however, the upper movable contact 612 and each lead wire 910a of brush 910 can be integrally formed. The resistor 617 is used to slow the rotation speed of motor 500 when the starter initially starts. Metal wires with a large resistance value are wound to configure resistor 617. The lower movable contact 611 located below the head portion 621 of the terminal bolt 620 is fixed with caulking, etc., to the other end of the resistor 617.

The lower movable contact 611 is composed of a metal such as copper having an outstanding conductivity. This contacts the upper surface of the stationary core 642 when the magnet switch 600 stops and the plunger 610 is at the lower position. When the resistor 617 moves upward with the movement of the plunger shaft 615, the lower movable contact 611 will contact the head portion 621 of the terminal bolt 620 before the upper movable contact 612 contacts the contact portion 631 of the fixed contact 630.

The details of magnet switch structure is not essential and no further description is made for brevity. For more details thereof, a copending Shiga et al U.S. application Ser. No. 08/353,987 filed Dec. 6, 1994 and assigned to the same assignee of this application is incorporated herein by reference.

[End Frame 700]

Figure 8:
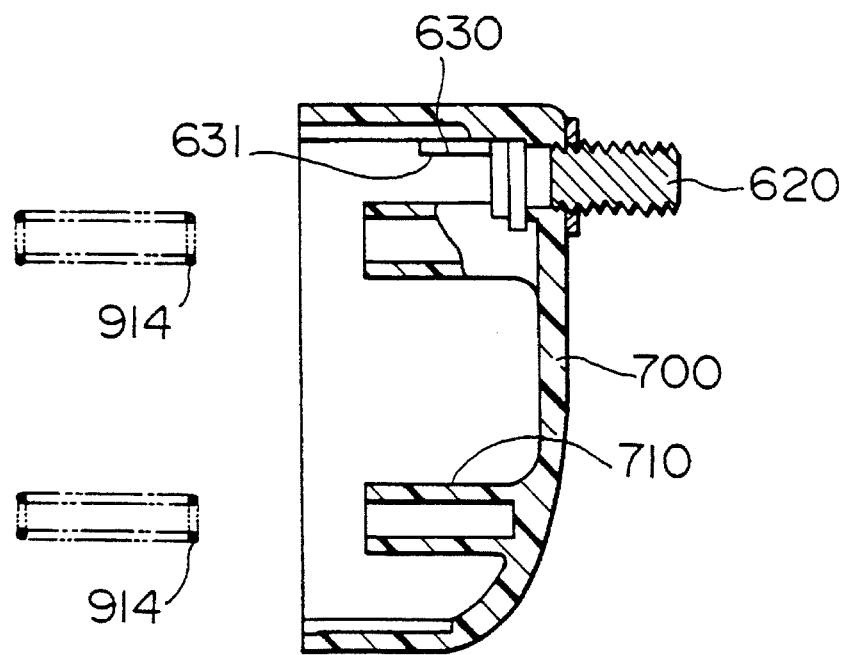
FIG. 8 is a cross-sectional view illustrating an end frame and brush springs.

As shown in FIG. 8, the end frame 700 is a magnet switch cover made of resin such as phenol resin. The magnet switch 600 is stored inside the frame. A spring holding pole 710 that holds a compressed coil spring 914 that biases the brush 910 toward the front is installed on the rear side of the end frame 700 to protrude forward according to the brush position.

[Brush Holding Member 900]

The brush holding member 900 separates the inner side of the yoke 501 and inner side of the end frame 700 and functions to rotatably support the end of the armature shaft 510 via a brush holder bearing 564. In addition, the brush holding member 900 can act as the brush holder, can support the magnet switch 600, and can hold the pulley 690 that guides the string-shaped member 680. The brush holding member 900 has a hole through which the string-shaped member 680 is passed.

The brush holding member is a partition made of cast metal such as aluminum having multiple brush holding holes (two on top and two on bottom in this embodiment) that hold the brush 910 in the axial direction. The brush 910 in the upper brush holding hole receives a positive voltage through the lead wire 910a, and supported axially slidably via a resin (e.g., nylon, phenol resin) insulation cylinder 913. The lower brush 910 is connected to the grounding, because this lower brush 910 is directly connected to the brush holder member 900.

In this manner, by holding the brush 910 with the brush holding member 900, a brush holder independent from the starter is not required. This allows the number of starter parts to be reduced and the assembly man-hours to be shortened.

The front end of the brush 910 is biased to the rear side of the upper coil end 534 at the back of the armature coil 530 by the compressed coil spring 914.

[Operation of the First Embodiment]

Next, the operation of the above starter according to the first embodiment will be explained according to the electrical circuit diagrams shown in FIGS. 9A through 9C.

Figure 9A:
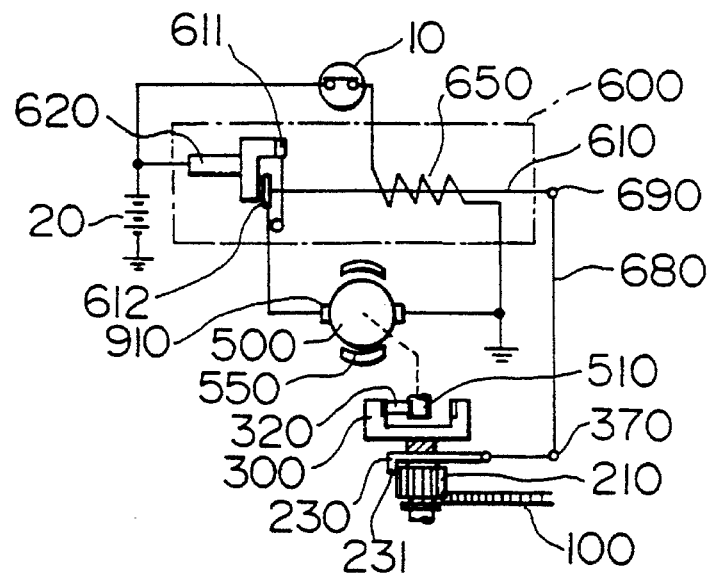
FIGS. 9A through 9C are electrical circuit diagrams indicating various operational modes of the first embodiment.

When a key switch 10 is set to the start position by the operator as shown in FIG. 9A, the attraction coil 650 in the magnet switch 600 is energized by a battery 20. When attraction coil 650 is energized, the plunger 610 is attracted by the magnetic force generated by the attraction coil 650 so that it is lifted upward.

When plunger 610 starts to rise, the upper movable contact 612 and lower movable contact 611 also rise, and the rear end of the string-shaped member 680 coupled to the plunger 610 also rises. When the rear end of the string-shaped member 680 rises, the forward end of the string-shaped member 680 is pulled downward, and the pinion rotation restriction member 230 lowers. When the pinion rotation restriction member 230 lowers, and the restriction claw 321 engages one of the notches 214 on the circumference of the pinion gear 210, the lower movable contact 611 contacts the head 621 of the terminal bolt 620. The voltage from battery 20 is applied to the terminal bolt 620, and the voltage of the terminal bolt 620 is conveyed to the upper brush 910 via the lower movable contact 611, resistor 617, upper movable contact 612 and lead wire 910a. In other words, the voltage lowered by the resistor 617 is conveyed to the armature coil 530 via the upper brush 910. As the lower brush 910 is constantly grounded via the brush holding member 900, the armature coil 530 configured with upper coil bars 531 and lower coil bars 532 combined into a coil is energized with this low voltage. The armature coil 530 then generates a relatively weak magnetic force. This magnetic force acts on (attracts or repulses) the magnetic force of the fixed magnetic pole 550, causing the armature 540 to rotate at a low speed.

When the armature shaft 510 rotates, the planetary gears 320 in the epicycle gear mechanism 300 are rotated and driven by the sun gear 310 on the front end of the armature shaft 510. If the planetary gears 320 apply the rotary torque to the internal gear 340, the rotation of the internal gear 340 will be restricted by the function of the overrunning clutch 330. In other words, the internal gear 340 will not rotate due to the engagement of the internal gear 340 with a center bracket 360 via the rollers 353 under the condition shown in FIG. 3, so the planet carrier 330 will decelerate and rotate due to the rotation of the planetary gear 320. If the planet carrier 330 rotates, the pinion gear 210 will also attempt to rotate, but as the rotation of the pinion gear 210 is restricted by the pinion rotation restriction member 230, the pinion gear 210 will advance axially along the helical spline 221 of the output shaft 220.

When the pinion gear 210 advances, the shutter 420 will also advance axially causing the opening 410 of the housing 400 to open. With the advance of the pinion gear 210, the pinion gear 210 will completely engage with the engine ring gear 100, and then will contact the pinion fitting ring 250. When the pinion gear 210 advance further, the restriction claw 231 will be disengaged from the notch 214 on the pinion gear 210, and then the restriction claw 231 will drop behind the washer 215 installed on the rear surface of the pinion gear 210.

Figure 9B:
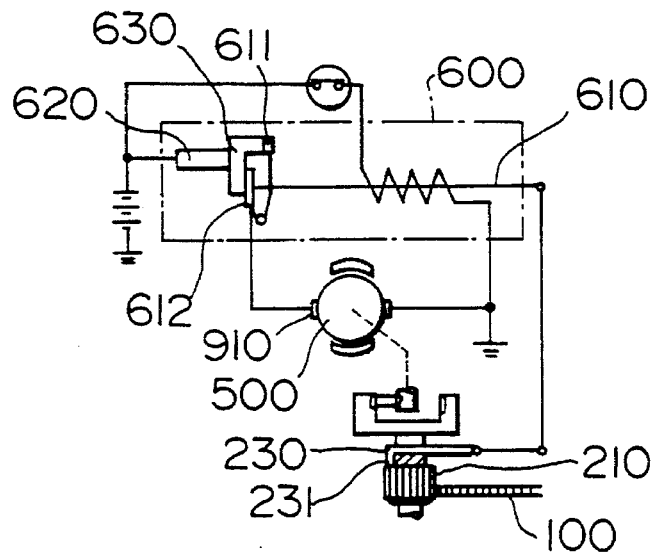

On the other hand, when the pinion gear 210 is advanced, the upper movable contact 612 will contact the contact portion 631 of the fixed contact 630 as shown in FIG. 9B. The battery voltage of the terminal bolt 620 will be directly conveyed to the upper brush 910 via the upper movable contact 612 and lead wire 910a. In other words, a high current will flow to the armature coil 530 configured of each upper coil bar 531 and each lower coil bar 532. The armature coil 530 will generate a large magnetic force, and will rotate the armature 540 at a high speed.

The rotation of the armature shaft 510 is decelerated by the epicycle gear mechanism 300 thus increasing the rotational torque, and the planet carrier 330 will be rotated and driven. At this time, the front end of the pinion gear 210 will contact the pinion fitting ring 250, and will rotate together with the planet carrier 330. Pinion gear 210 is engaged with the ring gear 100, so pinion gear 210 will rotate and drive the ring gear 100 thereby rotating and driving an engine output shaft.

To describe the overrunning clutch 350 in further detail, the engine drive output is conveyed to the planetary gears 320 from the drive shaft 220 during overrunning. The pinion gear rotation becomes higher than the rotation of the armature 540, and the clutch outer 351 integrated with the internal gear 340 that engages with the planetary gears 320 turn in the direction of the C arrow in FIG. 3. Due to the centrifugal force, the roller 353 is stored deep into the roller storage portion 351a of the clutch inner 352 by the roller storage guide portion 351d and roller guide portion 352c, and the clutch outer 351 runs idly around the clutch inner 352. When the clutch outer 351, or in other words the internal gear 340, runs idly, the conveyance of the engine drive force to the sun gear 310 formed on the armature shaft 510 is stopped, preventing the armature 540 from overrunning.

Next, when the engine starts and the engine ring gear 100 rotates faster than the pinion gear 210, a force to retract the pinion gear 210 will occur due to the function of the helical spline. The retraction of the pinion gear 210 will be prevented by the rotation restriction claw 231 that have dropped behind the pinion gear 210, and will prevent early separation of the pinion gear 210. Thus, the engine can be accurately started.

When the engine ring gear 100 rotates faster than the pinion gear 210 due to the successful starting of the engine, the pinion gear 210 will be rotated and driven by the rotation of the ring gear 100. The rotation torque conveyed to the pinion gear 210 from the ring gear 100 will be conveyed via the planet carrier 330 to the pins 332 that support the planetary gears 320. In other words, the planetary gears 320 are driven by the planet carrier 330. As a torque rotating in reverse of that when the motor is started will be applied on the internal gear 340, the overrunning clutch 350 will allow rotation of ring gear 100. In other words, when a torque rotating in reverse of that when the motor 500 is started is applied on the internal gear 340, the roller 353 of the overrunning clutch 340 will separate from the concave notch 355 on the clutch inner 352, and rotation of the internal gear 340 will be made possible.

When the engine starts, the relative rotation wherein the engine ring gear 100 rotates and drives the pinion gear 210 will be absorbed by the overrunning clutch 350 and the armature 540 will not be rotated and driven reversely by the engine.

Figure 9C:
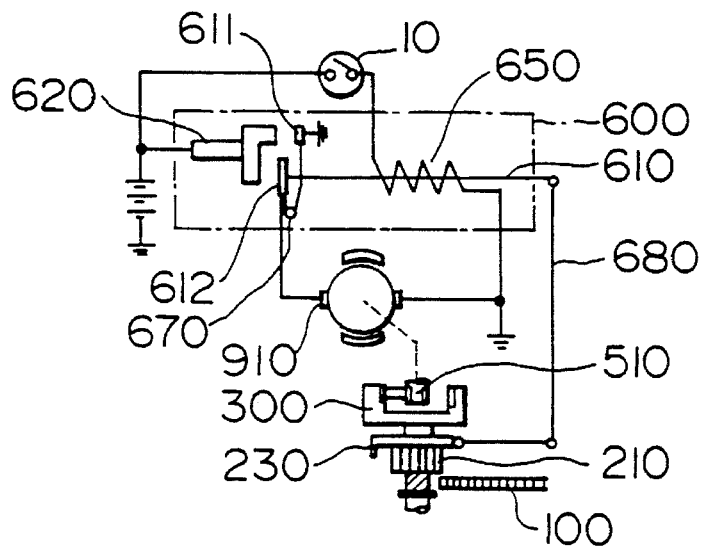

When the engine is started, the key switch 10 is removed from the start position by the operator as shown in FIG. 9C, and the conductivity to the attraction coil 650 in the magnet switch 600 is stopped. When the energizing the attraction coil 650 is stopped, the plunger 610 will return downward due to the function of the compressed coil spring 660. The upper movable contact 612 will be separated from the contact portion 631 of the fixed contact 630, and then the lower movable contact 611 will also be separated from the head portion 621 of the terminal bolt 620 causing the conductivity to the upper brush 910 to be stopped.

When the plunger 610 is returned downward, the pinion rotation restriction member 230 will return upward due to the function of the return spring 236 of the pinion rotation restriction member 230, and the restriction claw 231 will be separated from behind the pinion gear 210. The pinion gear 210 will be returned backward by the function of the return spring 240, and the engagement of the pinion gear 210 and engine ring gear 100 will be released. At the same time, the rear end of the pinion gear 210 will contact the flange-shaped projection portion 222 on the output shaft 220. In other words, the pinion gear 210 is returned to the position before the starter started.

When the plunger 610 is returned downward, the lower movable contact 611 contacts the upper surface of the stationary core 642 of the magnet switch 600, and the lead wire 910a of the upper brush 910 is conducted in the order of upper movable contact 612, resistor 617, lower movable contact 611, stationary core 642, magnet switch cover 640 and brush holding member 900. In other words, the upper brush 910 and lower brush 901 are short-circuited via brush holding material 900. On the other hand, an electromotive force is generated on the armature coil 530 by the coasting rotation of the armature 540. This electromotive force is short circuited via the upper brush 910, brush holding member 900 and lower brush 910, and thus a braking force is applied on the coasting rotation of the armature 540. As a result, the armature 540 stops instantly.

Advantage of the First Embodiment

The first cylindrical portion formed integrally with the internal gear 340 of the epicycle gear mechanism 300 acts as the clutch outer 351, and the second cylindrical portion which acts as the fixing side is used as the clutch inner 352 to form the roller storage portion 351a for the roller 353 on the inner circumference of the clutch outer 351. Thus, if the starter is overrun by the engine, when the internal gear 340 that is the clutch outer 351 runs idly to the clutch inner 352 to absorb the rotational difference between the motor 500 and pinion gear 210 when the starter is overrun by the engine, the roller 353 receives the centrifugal force and separates from the outer circumference of the clutch inner 352. This prevents abnormal wear of the roller 353 or outer circumference of the clutch inner 352.

The roller groove portion 355 is also formed on the clutch inner 352 so as to store part of the roller 353 normally. The roller 353 is interposed and is sandwiched in the front and rear torque conveyance direction by the roller storage portion 352a and roller contact surface of the roller groove portion 355, so a large stress such as the roller type overrunning clutch using a wedge-effect is not applied on each contact surface and the contact surface with the roller 353. Thus, an overrunning clutch with a large torque capacity can be provided.

As the overrunning clutch 350 uses the space on the outer circumference side of the center bracket 360 to rotatably support the output shaft 220 via the bearing 370, the axial length does not need to be lengthened for mounting the clutch 350, and the size can be reduced. By integrating the clutch inner 352 with the center bracket 360, the number of separate parts can be reduced.

Furthermore in this embodiment, the number of roller storage portions 351a on the clutch outer 351 is larger than the number of groove portions 355 on the clutch inner 352. Thus, if the roller 353 reengages with the roller storage portion 351a when the starter is started, such as when the roller 353 is not engaged with the roller storage portion 351a or when the engine is suddenly stopped from the starter overrun state and suddenly driven again, the idle run distance of the clutch inner 352 is shortened, and the impact generated during engagement can be suppressed.

Second Embodiment

Figure 10:
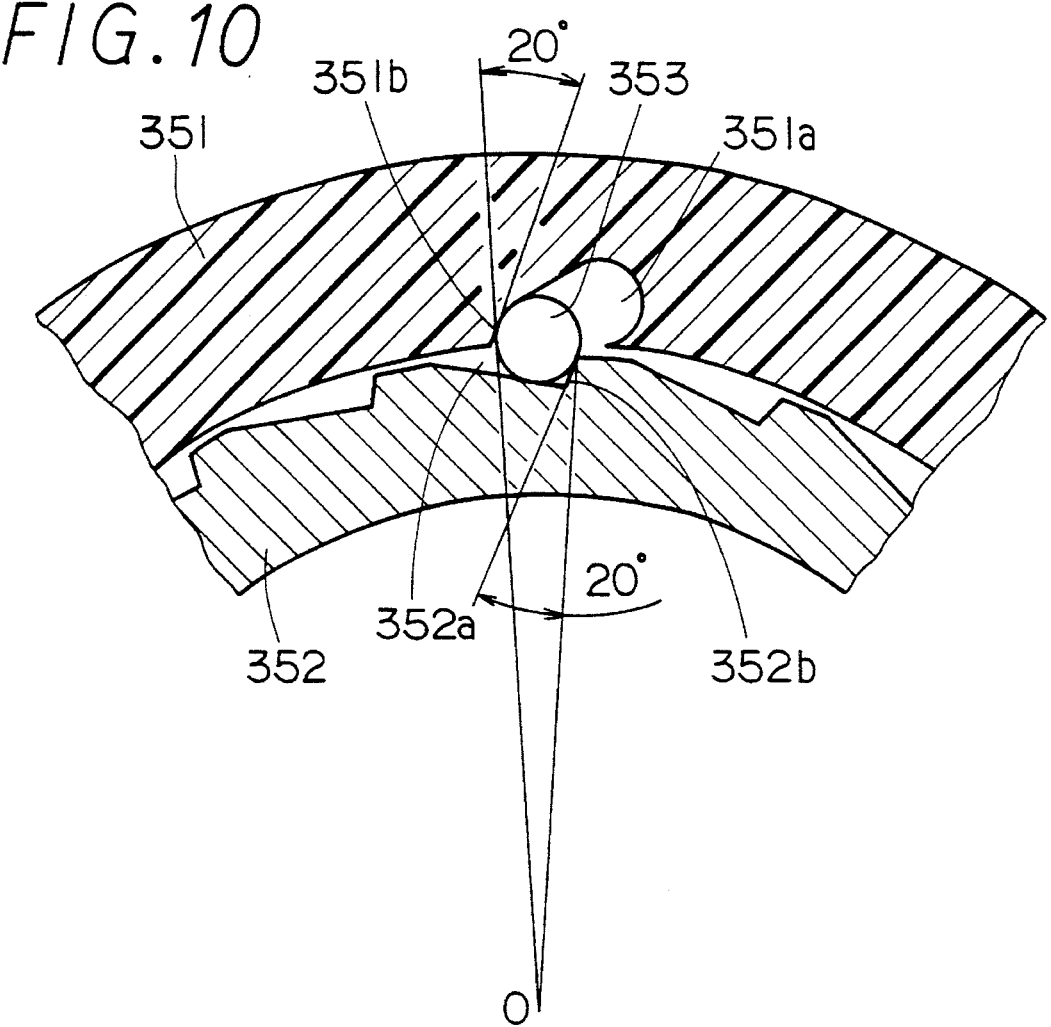
FIG. 10 is an enlarged cross-sectional view illustrating a part of the overrunning clutch according to the second embodiment.

The second embodiment will be described with reference to FIG. 10. In the second embodiment, the clutch outer 351 is integrally formed with the internal gear 340 by resin, and the clutch inner 352 is formed with aluminum. The angle that the roller engagement surfaces 351b and 352 form with the radius line from the shaft center O is formed to be approximately 20° which is generally a flat gear pressure angle. This is because the pressure angle of the resin internal gear 340 used in the epicycle gear reduction mechanism of the starter is generally 20°, and there is sufficient durability even when engaged in combination with metal gear having a pressure angle of 20°. Thus, if the roller engagement surface has the same angle as this pressure angle, it can be used integrally as the clutch outer or clutch inner. Use of nonferrous metal that has a lower strength than iron and steel material can be used instead of resin. In other words, material suitable for simple machining methods can be used.

In this embodiment, the roller engagement surface having a pressure angle equivalent to the pressure angle of flat gear was presented as an example. However, as shown in all embodiments, the roller is sandwiched from the forward and rear torque conveyance directions by the roller engagement surface of the clutch inner and clutch outer formed of the internal gear and starter stationary member, so a large stress is not applied on the contact surfaces of the clutch inner, clutch outer and roller as with the roller-type overrunning clutch in which the roller bites into the narrow direction of the wedge-shaped space to convey the torque. Thus, low-strength material such as resin or nonferrous metal can be used for the clutch inner and clutch outer material, and an inexpensive, lightweight overrunning clutch with sufficient durability can be provided.

Third Embodiment

Figure 11:
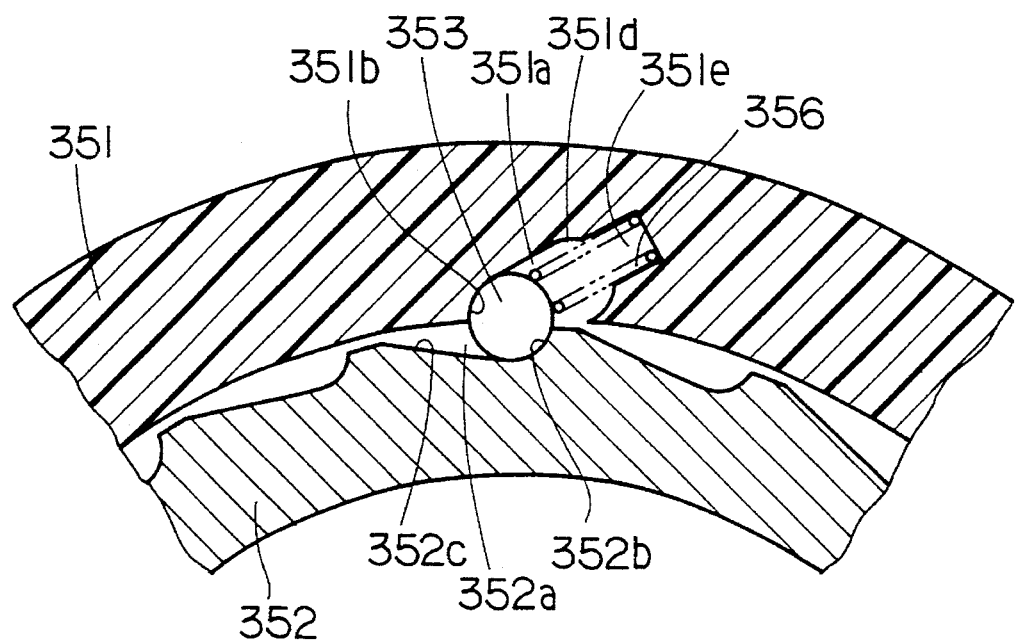
FIG. 11 is an enlarged cross-sectional view illustrating a part of the overrunning clutch according to the third embodiment.

As shown in FIG. 11, the third embodiment has a roller pressing spring 356 set in the roller storage portion 351a of the clutch outer 351 so that the roller 353 is pressed toward the roller groove portion 352a of the clutch inner 352. At the same time, a roller pressing spring storage portion 351e for storing one end of the roller pressing spring 356 is set in the roller storage portion 351a. Furthermore, the roller engagement surfaces 351b and 352b formed on the clutch outer 351 and clutch inner 352 are configured with a curve of which curvature radius is approximately the same as the radius of the roller 353. This widens the torque conveyance area and allows the clutch with a further large capacity to be obtained.

What is claimed is:

1. A starter comprising:

a starter motor having an armature shaft;

a drive shaft coaxial with said armature shaft;

a sun gear formed on an outer circumference of said armature shaft;

planetary gears set on one end of said drive shaft and engaged with said sun gear;

a speed reduction mechanism having an internal gear engaged with said planetary gears; and an overrunning clutch having a first cylinder portion disposed on said internal gear and extending in an axial direction, a second cylinder portion acting as a fixing side and set with a predetermined clearance relative to an inner circumference of said first cylinder portion, and a roller stored in a storage portion formed on said inner circumference of said first cylinder so that said roller does not contact an outer circumference of said second cylinder portion when said roller is stored in said storage portion.

2. The starter according to claim 1, wherein said second cylinder portion has a groove portion on said outer circumference thereof in which only a part of said roller fits.

3. The starter according to claim 2, wherein said groove portion has a greater quantity of grooves than said storage portion.

4. The starter according to claim 2 wherein a surface of said groove portion that fits said roller has a curvature radius approximately the same as the radius of said roller.

5. The starter according to claim 1, wherein said internal gear and said first cylinder portion are integrally formed of resin or nonferrous metal material.

6. The starter according to claim 1, wherein said second cylinder portion is integrally formed with a center bracket which rotatably supports said drive shaft and covers said gear reduction mechanism.

7. The starter according to claim 1, wherein a large diameter portion is formed at one end of said drive shaft to rotatably support said planetary gears thereon, and wherein said second cylinder portion at least partly overlap with an outer circumference of said large diameter portion.

8. A starter for a vehicle comprising:

a housing;

a starter motor coupled with said housing and having an armature shaft formed with a sun gear thereon;

a drive shaft supported in said housing coaxially with said armature shaft;

a gear mechanism having a plurality of planetary gears rotatably supported by said drive shaft and engaged with said sun gear, said mechanism further having an outer cylindrical portion formed with an internal gear engaged with said planetary gears at a first inner circumference thereof and formed with a roller storage portion at a second inner circumference thereof which is axially adjacent to said first inner circumference;

an inner cylindrical portion fixedly supported in said housing coaxially with said outer cylindrical portion formed with a roller groove at an outer circumference thereof to face said roller storage portion; and a roller interposed between said outer cylindrical portion and said inner cylindrical portion for engaging and disengaging said outer cylindrical portion with and from said inner cylindrical portion, respectively, said roller storage portion and said roller groove being shaped to move said roller fully into said roller storage portion when said drive shaft overruns relative to said armature shaft.

* * * * *